US012798553B2

(12) United States Patent
Laine et al.

(10) Patent No.: US 12,798,553 B2
(45) Date of Patent: Nov. 17, 2026

(54) CONTROL SYSTEM FOR DETERMINING A REFERENCE SIDE AREA FOR A VEHICLE ENTITY

(71) Applicant: Volvo Truck Corporation, Gothenburg (SE)

(72) Inventors: Leo Laine, Härryda (SE); Kristoffer Tagesson, Hammarö (SE); Mikael Askerdal, Åsa (SE)

(73) Assignee: Volvo Truck Corporation, Gothenburg (SE)

( * ) Notice: Subject to any disclaimer, the term of this patent is extended or adjusted under 35 U.S.C. 154(b) by 158 days.

(21) Appl. No.: 18/835,763

(22) PCT Filed: Feb. 11, 2022

(86) PCT No.: PCT/EP2022/053306
§ 371 (c)(1),
(2) Date: Aug. 5, 2024

(87) PCT Pub. No.: WO2023/151801
PCT Pub. Date: Aug. 17, 2023

(65) Prior Publication Data
US 2025/0136088 A1 May 1, 2025

(51) Int. Cl.
*B60W 30/04* (2006.01)
*B60G 17/0165* (2006.01)
(Continued)

(52) U.S. Cl.
CPC ......... *B60W 30/04* (2013.01); *B60G 17/0165* (2013.01); *B60W 10/22* (2013.01);
(Continued)

(58) Field of Classification Search
CPC ...... B60W 30/04; B60W 10/22; B60W 40/02; B60W 2555/20; B60W 2520/18;
(Continued)

(56) References Cited

U.S. PATENT DOCUMENTS 5,379,218 A * 1/1995 Jacobi .................... B62D 37/02 296/180.1
5,825,284 A * 10/1998 Dunwoody ............. B61F 5/245 340/440
(Continued)

FOREIGN PATENT DOCUMENTS

DE 10326190 A1 12/2004
DE 102020004986 A1 10/2020

OTHER PUBLICATIONS

International Search Report and Written Opinion for International Patent Application No. PCT/EP2022/053306, mailed Oct. 18, 2022, 13 pages.

*Primary Examiner* — Kurt Philip Liethen
*Assistant Examiner* — John D Bailey
(74) *Attorney, Agent, or Firm* — Withrow & Terranova, PLLC

(57) ABSTRACT

A control system for determining a reference side area for a vehicle entity. The vehicle entity is a vehicle or a vehicle trailer and having a nominal vehicle entity side area. The reference side area is adapted to be multiplied with a side force coefficient for determining a side force parameter proportional to a wind side force load imparted on the vehicle entity and/or to be multiplied with a lift coefficient for determining a lift parameter proportional to a wind lift load imparted on the vehicle entity and/or to be combined with a drag coefficient for determining a drag load imparted on the vehicle entity. The vehicle entity comprises a load surface adapted to receive a material load such that at least a portion of the material load can be exposed to wind loads. The load surface being associated with a load surface area and a load surface length.

26 Claims, 6 Drawing Sheets

(51) Int. Cl.
*B60W 10/22* (2006.01)
*B60W 40/02* (2006.01)

(52) U.S. Cl.
CPC ..... *B60W 40/02* (2013.01); *B60G 2400/0511* (2013.01); *B60G 2400/60* (2013.01); *B60G 2400/841* (2013.01); *B60W 2520/18* (2013.01); *B60W 2530/10* (2013.01); *B60W 2555/20* (2020.02)

(58) Field of Classification Search
CPC ........... B60W 2530/10; B60G 17/0165; B60G 2400/0511; B60G 2400/60; B60G 2400/841
USPC ........................................................... 701/37
See application file for complete search history.

(56) References Cited

U.S. PATENT DOCUMENTS 6,185,489 B1 * 2/2001 Strickler ............ B60G 17/0162 701/38
6,626,478 B1 * 9/2003 Minton .............. B62D 33/0273 224/403
7,347,485 B1 * 3/2008 Saunders ................. B62J 17/10 296/96
8,967,311 B2 * 3/2015 Smith .................. B62D 35/001 180/68.2
10,220,890 B2 * 3/2019 Amar ................... B62D 35/004
10,377,330 B2 * 8/2019 Watanabe ........... B60R 21/0132
11,618,459 B1 * 4/2023 Fujii ..................... B60W 50/14 701/68
11,634,147 B1 * 4/2023 Ravella ............... B60C 23/0484 701/26
12,441,415 B2 * 10/2025 Burrows .............. B62D 35/001
2002/0116104 A1 * 8/2002 Kawashima ........... B60G 7/006 280/5.515
2005/0023867 A1 * 2/2005 Kreiner .................. B60J 7/0573 296/223
2006/0030991 A1 * 2/2006 Barta ..................... B62D 6/002 701/70
2006/0076741 A1 * 4/2006 Lim ................... B60G 17/0162 280/5.508
2006/0085111 A1 * 4/2006 Kojima .................. A63H 17/16 701/41
2006/0232102 A1 * 10/2006 Steel .................... B62D 35/001 296/180.1
2006/0244579 A1 * 11/2006 Raab ....................... B60T 8/241 340/438
2006/0273625 A1 * 12/2006 Andrus ................ B62D 35/004 296/180.1
2008/0048465 A1 * 2/2008 Hawley ............. B62D 33/0273 296/26.11
2010/0185354 A1 * 7/2010 Pruett ................... B60W 30/04 701/31.4
2011/0160977 A1 * 6/2011 Matsuda ............... B60T 8/1706 701/85
2011/0241377 A1 * 10/2011 Rogers ................. B62D 35/001 296/180.3
2013/0080018 A1 * 3/2013 Baek ..................... B60W 30/16 701/1
2013/0106135 A1 * 5/2013 Praskovsky .......... B62D 35/001 296/180.1
2013/0132025 A1 * 5/2013 Watanabe ............... G01M 1/10 702/150
2015/0239409 A1 * 8/2015 Mousa ................... B62D 61/12 280/755
2016/0244108 A1 * 8/2016 Tsuruta .................. B62D 37/02
2018/0162400 A1 * 6/2018 Abdar ............. B60W 30/18009
2018/0237141 A1 * 8/2018 Heppe ....................... B64B 1/52
2020/0023913 A1 * 1/2020 Hon ....................... B60G 13/10
2022/0041227 A1 * 2/2022 Regan .................. B62D 35/001
2024/0199076 A1 * 6/2024 Wiberg .............. B60W 60/0011
2025/0091643 A1 * 3/2025 Zhu ....................... B60W 10/18

* cited by examiner

CONTROL SYSTEM FOR DETERMINING A REFERENCE SIDE AREA FOR A VEHICLE ENTITY

This application is a 35 USC 371 national phase filing of International Application No. PCT/EP2022/053306, filed Feb. 11, 2022, the disclosure of which is incorporated herein by reference in its entirety.

TECHNICAL FIELD

The invention relates to a control system for determining a reference side area for a vehicle entity. Moreover, the invention relates to a vehicle entity. Additionally, the invention relates to a method for determining a reference side area for a vehicle entity.

The invention can be applied in heavy-duty vehicles, such as trucks, buses and construction equipment. Although the invention will be described with respect to a truck, the invention is not restricted to this particular vehicle, but may also be used in other vehicles such as wheel loaders, haulers or the like.

BACKGROUND

A vehicle entity, for instance a vehicle trailer or a truck, may be subjected to wind loads during operation. Such wind loads may for instance result in transversal loads imparted on the vehicle entity which may impair the drive behaviour of the vehicle entity. Moreover, the wind loads may result in a wind induced roll moment that may increase the risk for roll-over of the vehicle entity.

To this end, according to its abstract, US 2018/0162400 A1 discloses that one or more devices, systems, and/or methods for controlling a motor vehicle based upon wind are provided. For example, a first measurement of wind detected by a first sensor coupled to the motor vehicle may be received from the first sensor. A second measurement of wind associated with a location of the motor vehicle may be received from a server. A wind effect (e.g., cost, inefficiency, danger, etc.) on the motor vehicle may be determined based upon the first measurement of wind and/or the second measurement of wind. A corrective action for the motor vehicle may be determined based upon the wind effect, and may be implemented on the motor vehicle.

Although the US 2018/0162400 A1 method or device may be used for controlling a vehicle whilst taking wind loads into account, there is still a need for further development within the technical field of vehicle control in response to wind induced loads.

SUMMARY

An object according to a first aspect of the present invention is to provide a control system by which it is possible to determine information that can be used for determining wind loads with an appropriate level of accuracy.

As such, a first aspect of the present invention relates to a control system for determining a reference side area for a vehicle entity. The vehicle entity is a vehicle or a vehicle trailer and has a nominal vehicle entity side area. The reference side area is adapted to be multiplied with a side force coefficient for determining a side force parameter proportional to a wind side force load imparted on the vehicle entity and/or to be multiplied with a lift coefficient for determining a lift parameter proportional to a wind lift load imparted on the vehicle entity and/or to be combined with a drag coefficient for determining a drag load imparted on the vehicle entity.

The vehicle entity comprises a load surface adapted to receive a material load such that at least a portion of the material load can be exposed to wind loads. The load surface is associated with a load surface area and a load surface length.

The vehicle entity has a longitudinal extension in a longitudinal direction, a transversal extension in a transversal direction and a vertical extension in a vertical direction such that when the vehicle entity is supported by a horizontally extending ground surface, the vertical direction is parallel to a normal of the horizontally extending ground surface, the longitudinal direction corresponds to an intended direction of travel of the vehicle entity and the transversal direction is perpendicular to each one of the longitudinal direction and the vertical direction.

The load surface area extends in a plane, the normal of which is parallel to the vertical direction. The load surface length extends in the longitudinal direction. Each one of the reference side area and the nominal vehicle entity side area extends in a plane, the normal of which is parallel to the transversal direction.

The control system is adapted to:

- receive density information indicative of a density (ρ) of material loaded onto the load surface;
- receive weight information indicative of a weight of material loaded onto the load surface;
- use the density information, the weight information, the load surface area and the load surface length in order to determine a material load surface area, the material load surface area extending in a plane, the normal of which is parallel to the transversal direction, and
- use the material load surface area and the nominal vehicle entity side area in order to determine the reference side area.

The control system in accordance with the first aspect of the present invention implies that a reference side area may be determined taking prevailing conditions of the vehicle entity into account. As such, rather than using a predetermined value of the reference side area when determining wind loads imparted on the vehicle entity, the control system according to the first aspect of the present invention may determine a reference side area that better reflects the actual condition of the vehicle entity. Since a wind load determined using a side force or lift equation generally is proportional to the magnitude of the reference side area, an improved estimate of the reference side area may result in improved estimates of the wind loads imparted on the vehicle entity, as compared to the wind loads that are determined under the assumption that the reference side area is a predetermined value.

Optionally, the control system is adapted to:

- determine a material load surface area portion that is not covered by the vehicle entity, as seen in the transversal direction, and
- add the material load surface area portion to the nominal vehicle entity side area in order to determine the reference side area.

The above implies and appropriate estimate of the reference side area.

Optionally, the control system is adapted to:

- use the density information, the weight information and the load surface area to thereby determine a height of the material load, and use the height of the material load and the load surface length in order to determine the material load surface area.

Optionally, the control system is adapted to use a parameter indicative of a width of the vehicle entity in the transversal direction and to determine the side force coefficient on the basis of at least the width of the vehicle entity and the height of the material load.

The side force coefficient is generally dependent on the shape of the body subject to the wind load. For instance, a body having a square cross-sectional shape has a side force coefficient being different from the side force coefficient of a body having an elongate cross-sectional shape. As such, the above-mentioned feature to determine the side force coefficient may further improve the quality of the wind load using the reference side area and the side force coefficient.

Optionally, the control system is adapted to receive wind information for a wind condition currently acting on the vehicle entity. The wind information is indicative of a wind speed, relative to the vehicle entity, and a wind heading, relative to the vehicle entity. The control system is adapted to use the wind information, the reference side area and the side force coefficient for determining a wind side force load imparted on the vehicle entity. Preferably, the wind side force load comprises a wind-imparted roll moment around a roll axle which is parallel to the longitudinal direction.

Optionally, the control system is adapted to receive wind information for a wind condition currently acting on the vehicle entity, the wind information being indicative of a wind speed, relative to the vehicle entity, and a wind heading, relative to the vehicle entity. The control system is adapted to use the wind information, the reference side area and the lift coefficient for determining a wind lift load imparted on the vehicle entity.

Optionally, the vehicle entity comprises a wind sensor adapted to determine the wind information. The control system is adapted to receive the wind information from the wind sensor.

Optionally, the vehicle entity comprises a density input unit via which an operator can enter the density information. The control system is adapted to receive the density information from the density input unit.

Optionally, the control system is adapted to determine a vertical centre and/or a longitudinal centre of the reference side area on the basis of at least the nominal vehicle entity side area, the density information, the weight information and the load surface area. Information indicative of the vertical centre and/or the longitudinal centre may be useful when for instance determining one or more wind induced moments, e.g. a roll moment using the vertical centre or a yaw moment using the longitudinal centre, imparted on the vehicle entity.

Optionally, the vehicle entity comprises a suspension system and the control system is adapted to receive information from and/or to issue information to the suspension system.

Optionally, the control system is adapted to use information from the suspension system as the weight information. The above possibility implies that the need for using separate or dedicated weight sensors may be omitted.

Optionally, the control system is adapted to issue information to the suspension system in dependence on the determined wind side force load imparted on the vehicle entity.

Optionally, the control system is adapted to, in response to detecting that the wind side force load imparted on the vehicle entity results in a rollover risk exceeding a predetermined risk threshold, issue information to the suspension system such that the vehicle entity assumes a condition with a static inclination towards a windward side of the vehicle entity.

A second aspect of the present invention relates to a vehicle entity being a vehicle or a vehicle trailer and having a nominal vehicle entity side area. The vehicle entity comprises a load surface adapted to receive a material load such that at least a portion of the material load can be exposed to wind loads. The load surface is associated with a load surface area and a load surface length.

The vehicle entity has a longitudinal extension in a longitudinal direction, a transversal extension in a transversal direction and a vertical extension in a vertical direction such that when the vehicle entity is supported by a horizontally extending ground surface, the vertical direction is parallel to a normal of the horizontally extending ground surface, the longitudinal direction corresponds to an intended direction of travel of the vehicle entity and the transversal direction is perpendicular to each one of the longitudinal direction and the vertical direction.

The load surface area extends in a plane, the normal of which is parallel to the vertical direction, the load surface length extending in the longitudinal direction, each one of the reference side area and the nominal vehicle entity side area extending in a plane, the normal of which is parallel to the transversal direction.

The vehicle entity comprises a control system according to the first aspect of the present invention.

Optionally, the vehicle entity comprises a suspension system adapted to issue information indicative of the condition of the suspension system.

Optionally, the vehicle entity comprises a wind sensor adapted to determine wind information for a wind load currently imparted on the vehicle entity, the wind information being indicative of a wind speed, relative to the vehicle entity, and a wind heading, relative to the vehicle entity.

Optionally, the vehicle entity comprises a density input unit via which an operator can enter the density information.

A third aspect according to the present invention relates to a method for determining a reference side area for a vehicle entity. The vehicle entity is a vehicle or a vehicle trailer and has a nominal vehicle entity side area. The reference side area is adapted to be multiplied with a side force coefficient for determining a side force parameter proportional to a wind side force load imparted on the vehicle entity and/or to be multiplied with a lift coefficient for determining a lift parameter proportional to a wind lift load imparted on the vehicle entity and/or to be combined with a drag coefficient for determining a drag load imparted on the vehicle entity. The vehicle entity comprises a load surface adapted to receive a material load such that at least a portion of the material load can be exposed to wind loads. The load surface is associated with a load surface area and a load surface length.

The vehicle entity has a longitudinal extension in a longitudinal direction, a transversal extension in a transversal direction and a vertical extension in a vertical direction such that when the vehicle entity is supported by a horizontally extending ground surface, the vertical direction is parallel to a normal of the horizontally extending ground surface, the longitudinal direction corresponds to an intended direction of travel of the vehicle entity and the transversal direction is perpendicular to each one of the longitudinal direction and the vertical direction.

The load surface area extends in a plane, the normal of which is parallel to the vertical direction. The load surface length extends in the longitudinal direction. Each one of the reference side area and the nominal vehicle entity side area extends in a plane, the normal of which is parallel to the transversal direction.

The method comprises:

receiving density information indicative of a density of material loaded onto the load surface;

receiving weight information indicative of a weight of material loaded onto the load surface;

using the density information, the weight information, the load surface area and the load surface length in order to determine a material load surface area, the material load surface area extending in a plane, the normal of which is parallel to the transversal direction, and using the material load surface area and the nominal vehicle entity side area in order to determine the reference side area.

Optionally, the method further comprises:

determining a material load surface area portion that is not covered by the vehicle entity, as seen in the transversal direction, and adding the material load surface area portion to the nominal vehicle entity side area in order to determine the reference side area.

Optionally, the method comprises:

using the density information, the weight information and the load surface area to thereby determine a height of the material load, and using the height of the material load and the load surface length in order to determine the material load surface area.

Optionally, the method further comprises using a parameter indicative of a width of the vehicle entity in the transversal direction and determining the side force coefficient on the basis of at least the width of the vehicle entity and the height of the material load.

Optionally, the method further comprises receiving wind information for a wind condition currently acting on the vehicle entity, the wind information being indicative of a wind speed, relative to the vehicle entity, and a wind heading, relative to the vehicle entity. The method comprises using the wind information, the reference side area and the side force coefficient for determining a wind side force load imparted on the vehicle entity. Preferably, the wind side force load comprises a wind-imparted roll moment around a roll axle which is parallel to the longitudinal direction.

Optionally, the method further comprises receiving wind information for a wind condition currently acting on the vehicle entity. The wind information is indicative of a wind speed, relative to the vehicle entity, and a wind heading, relative to the vehicle entity. The method comprises using the wind information, the reference side area and the lift coefficient for determining a wind lift load imparted on the vehicle entity.

Optionally, the vehicle entity comprises a wind sensor adapted to determine the wind information. The method comprises receiving the wind information from the wind sensor.

Optionally, the vehicle entity comprises a density input unit via which an operator can enter the density information. The method comprises receiving the density information from the density input unit.

Optionally, the method comprises determining a vertical centre and/or a longitudinal centre of the reference side area on the basis of at least the nominal vehicle entity side area, the density information, the weight information and the load surface area.

Optionally, the vehicle entity comprises a suspension system and the method comprises receiving information from and/or issuing information to the suspension system.

Optionally, the method comprises using information from the suspension system as the weight information.

Optionally, the method further comprises issuing information to the suspension system in dependence on the determined wind side force load imparted on the vehicle entity.

Optionally, the method comprises, in response to detecting that the wind side force load imparted on the vehicle entity results in a rollover risk exceeding a predetermined risk threshold, issuing information to the suspension system such that the vehicle entity assumes a condition with a static inclination towards a windward side of the vehicle entity.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
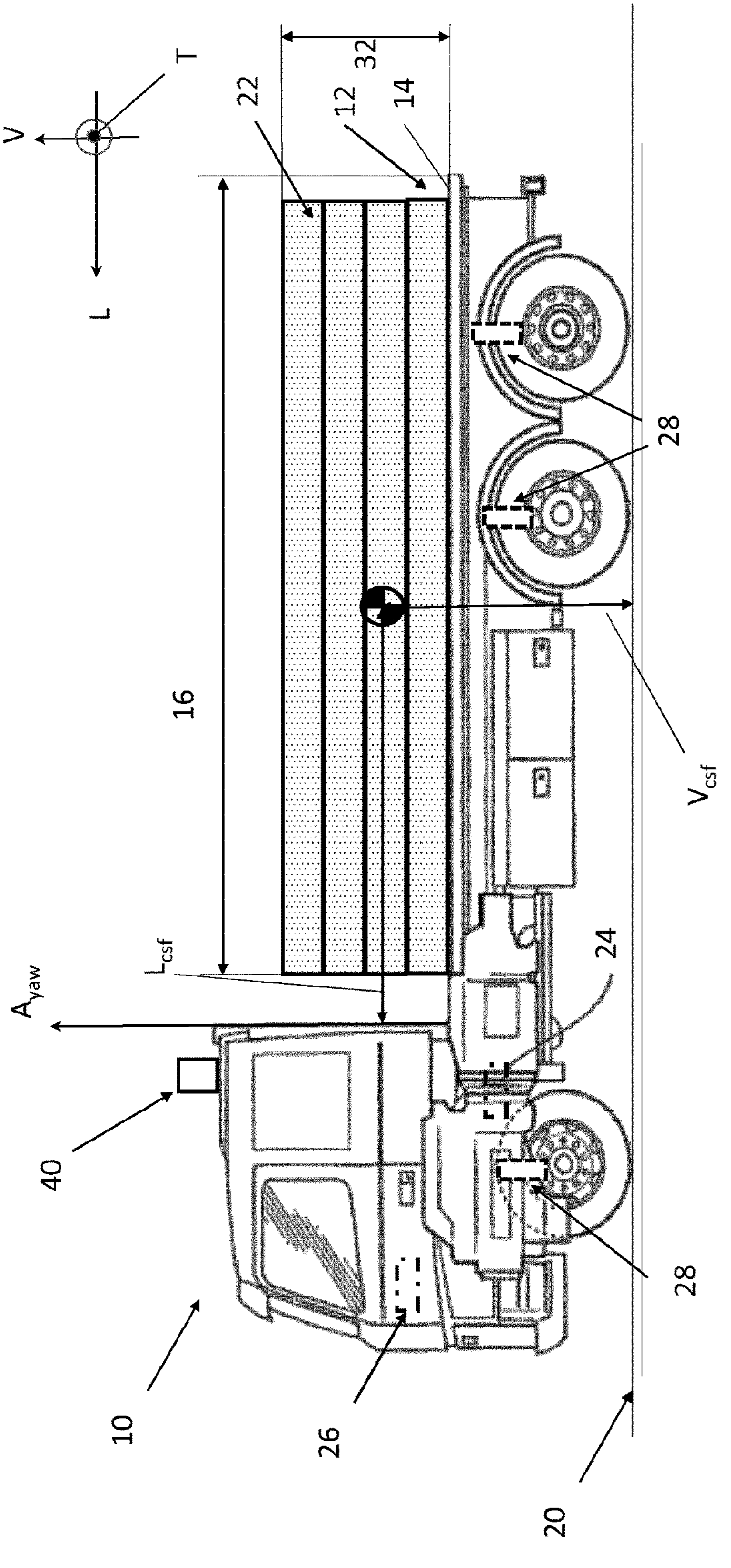
FIG. 1 is a side view of a vehicle entity according to an embodiment of the present invention.

FIG. 1 is a side view of a vehicle entity 10 according to the present invention. In FIG. 1, the vehicle entity 10 is exemplified as a truck. However, it is also envisaged that the vehicle entity 10 according to the present invention may be another type of vehicle, such as a trailer (not shown) or a vehicle combination comprising a tractor and one or more trailers (not shown).

As may be gleaned from FIG. 1, the vehicle entity 10 comprises a load surface 12 adapted to receive a material load such that at least a portion of the material load can be exposed to wind loads. The load surface 12 is associated with a load surface area 14 and a load surface length 16. By way of example, the load surface area 14 may be determined using the load surface length 16 and a load surface width 18 (see FIG. 2), for instance by multiplying the load surface length 16 and the load surface width 18.

Moreover, as indicated in FIG. 1, the vehicle entity 10 has a longitudinal extension in a longitudinal direction L, a transversal extension in a transversal direction T and a vertical extension in a vertical direction V such that when the vehicle entity 10 is supported by a horizontally extending ground surface 20, the vertical direction V is parallel to a normal of the horizontally extending ground surface 20, the longitudinal direction L corresponds to an intended direction of travel of the vehicle entity 10 and the transversal direction T is perpendicular to each one of the longitudinal direction L and the vertical direction V.

The load surface area 14 extends in a plane, the normal of which is parallel to the vertical direction V. It should be noted that the normal of the plane in which the load surface area 14 extends is parallel to the vertical direction V at least when the vehicle entity 10 is in a load receiving condition. As will be elaborated on hereinbelow, the normal of the load surface area plane may form an angle with the vertical direction V in certain operating conditions of the vehicle entity 10.

The load surface length 16 extends in the longitudinal direction L. Each one of the reference side area and the nominal vehicle entity side area extends in a plane, the normal of which is parallel to the transversal direction T.

Figure 2:
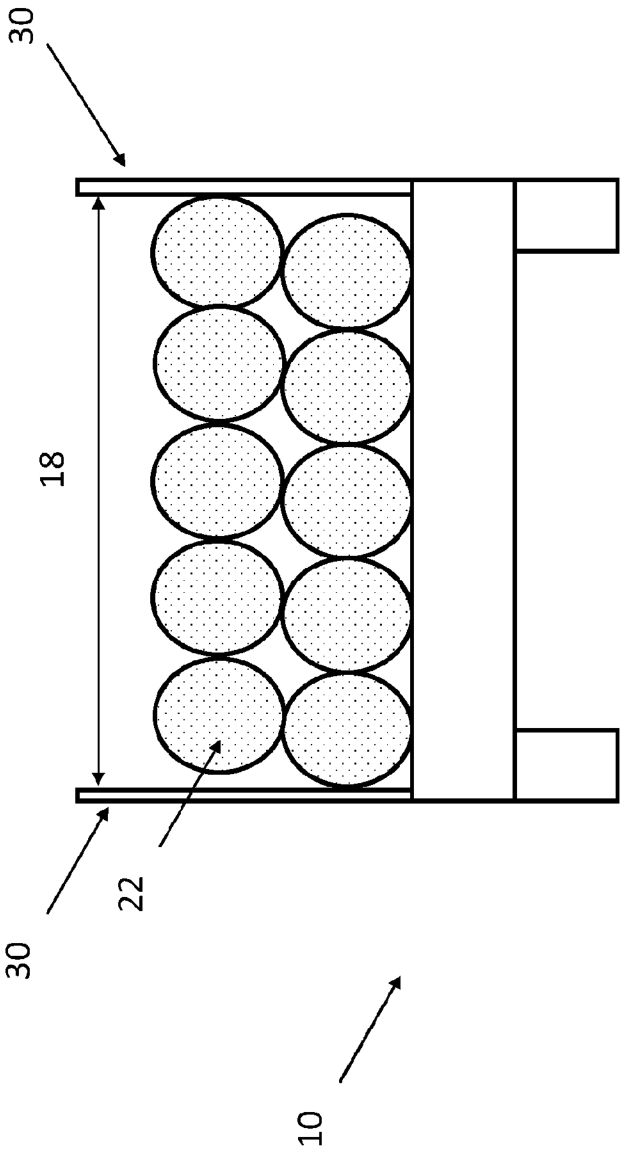
FIG. 2 is a rear view of the FIG. 1 vehicle entity.

FIG. 1 and FIG. 2 further illustrate that the vehicle entity 10 can be loaded with a material load 22 which in FIG. 1 and FIG. 2 is exemplified as timber. However, it is of course contemplated that the material load 22 may comprise or be constituted by other materials, such as rocks and/or gravel.

Figure 3:
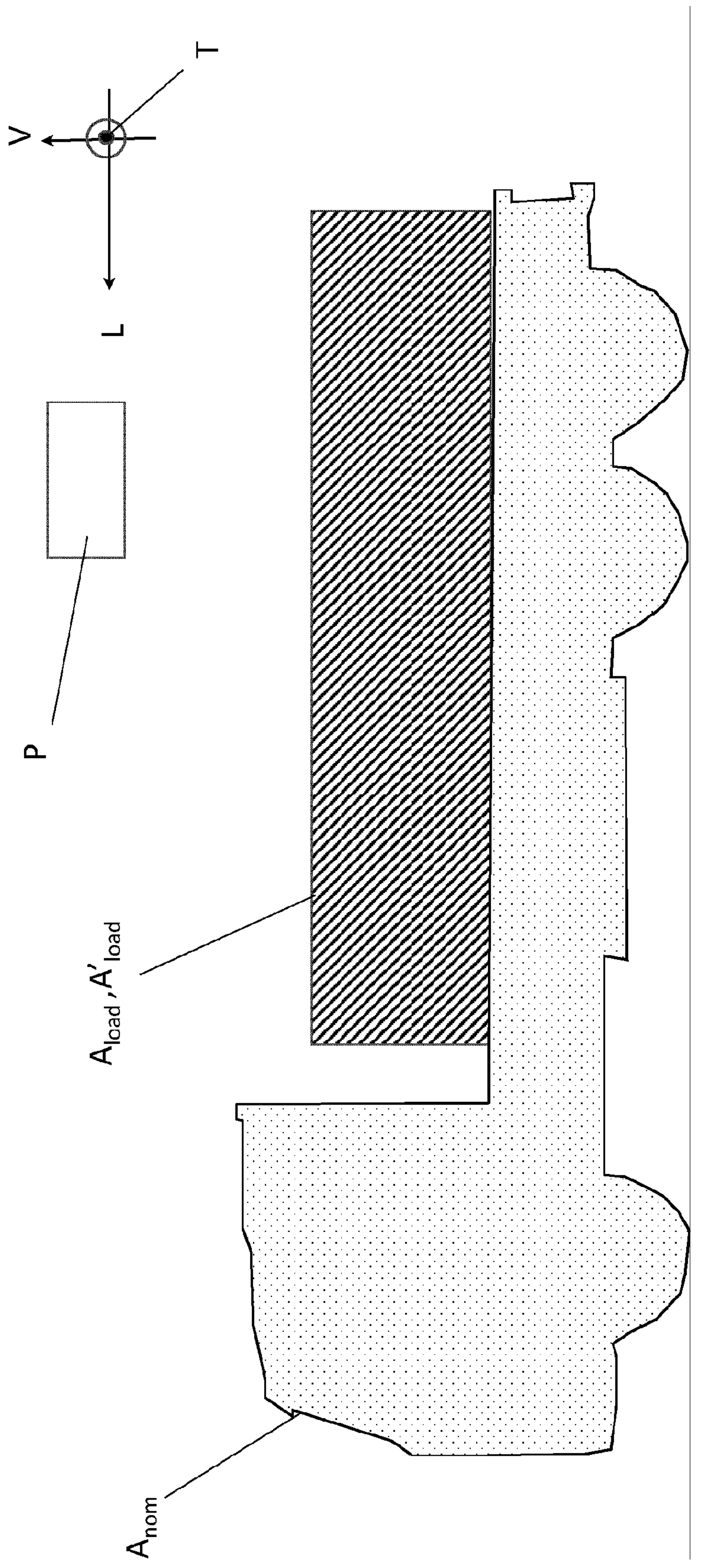
FIG. 3 is a schematic side view illustrating areas of portions of a vehicle entity.

Moreover, as indicated in FIG. 3, the vehicle entity 10 has a nominal vehicle entity side area $A_{nom}$ which is the side area of the vehicle entity 10 when it does not carry any load. Further, when the vehicle entity 10 is loaded with a material load, the material load has a material load surface area $A_{load}$ as also indicated in FIG. 3.

Reverting to FIG. 1, the vehicle entity 10 comprises a control system 24 for determining a reference side area $A_{ref}$ for the vehicle entity 10. The reference side area $A_{ref}$ is adapted to be multiplied with a side force coefficient $C_s$ for determining a side force parameter $C_sA_{ref}$ proportional to a wind side force load $F_{side\_force}$ imparted on the vehicle entity 10 and/or to be multiplied with a lift coefficient $C_l$ for determining a lift parameter $C_lA_{ref}$ proportional to a wind lift load $F_{lift}$ imparted on the vehicle entity 10 and/or to be combined with a drag coefficient $C_d$ for determining a drag load $F_{drag}$ imparted on the vehicle entity 10.

As a general remark, it should be noted that the presentation of the control system 24 according to the present invention is equally applicable to the method of the present invention. Moreover, as a further general remark, although the control system 24 is schematically illustrated as a control unit in FIG. 1, the control system 24 in accordance with the present invention may comprise one or more control units (not shown) connected to each other and operating together.

According to the invention, the control system 24 is adapted to receive density information indicative of a density $\rho$ of material 22 loaded onto the load surface 12. Purely by way of example, the vehicle entity 10 may comprise a density input unit 26 via which an operator can enter the density information. The control system 24 may be adapted to receive the density information from the density input unit 26. However, it is also envisaged that the density information may be received using other means. As a first non-limiting example, the density information may be determined using a system (not shown) that comprises an image sensor, such as a camera, which captures one or more images of the material load to be loaded onto the load surface 12 and which determines density information on the basis of the one or more images. As a second non-limiting example, the density information may be determined using a system (not shown) that comprises a position sensor adapted to determine the current position of the vehicle entity 10 and the system may determine the density information on the basis of position density information associated with the thus determined current position.

Moreover, the control system 24 is adapted to receive weight information indicative of a weight $w_{material}$ of material loaded onto the load surface 12. To this end, though purely by way of example, the vehicle entity 10 may comprise a suspension system 28 and the control system 24 may be adapted to receive information from and/or to issue information to the suspension system 28. The suspension system may be a wheel suspension system as indicated in FIG. 1.

For instance, concerning the above-mentioned weight information, the control system 24 may be adapted to use information from the suspension system 28 as the weight information. Purely by way of example, the control system 24 may be adapted to receive information indicative of the pressure in one or more bellows (not shown) of the suspension system 28 before and after material 22 has been loaded onto the load surface 12 and from the differences between the two pressures determine the weight $w_{material}$ of material 22 loaded onto the load surface 12. As such, in the above example, the weight information comprises, or may even be constituted by, the pressure information from the suspension system 28.

However, it is contemplated that embodiments of the control system 24 may use other means for determining the weight $w_{material}$ of material 22 loaded onto the load surface 12.

Purely by way of example, it is envisaged that embodiments of the control system 24 may be adapted to receive information from weighing scales (not shown), such as load cells, onto which the vehicle entity 10 is adapted to be located such that the scales or load cells can determine the weight $w_{material}$ of material 22 loaded onto the load surface 12.

Further, the control system 24 is adapted to use the density information, the weight information, the load surface area 14 and the load surface length 16 in order to determine a material load surface area $A_{load}$ (see FIG. 3). The material load surface area $A_{load}$ extends in a plane P, the normal of which is parallel to the transversal direction T. Moreover, the control system 24 is adapted to use the material load surface area $A_{load}$ and the nominal vehicle entity side area $A_{nom}$ in order to determine the reference side area $A_{ref}$.

For the sake of completeness, it should be noted that each one of the reference side area $A_{ref}$ and the nominal vehicle entity side area $A_{nom}$ also extends in the plane P, the normal of which is parallel to the transversal direction T.

As a non-limiting example, with reference to FIG. 3, the control system 24 may be adapted to determine a material load surface area portion $A'_{load}$ that is not covered by the vehicle entity 10, as seen in the transversal direction T. In FIG. 3, the material load surface area portion $A'_{load}$ is equal to the material load surface area $A_{load}$ since the vehicle entity 10 does not comprise any side panels or the like that covers any portion of the load 22. To this end, it should be noted that the stands 30 (see FIG. 2) are deemed to have a negligible side area. However, in other embodiments of the vehicle entity 10, the material load surface area portion $A'_{load}$ may be smaller than the material load surface area $A_{load}$. Moreover, the control system 24 may be adapted to add the material load surface area portion $A'_{load}$ to the nominal vehicle entity side area $A_{nom}$ in order to determine the reference side area $A_{ref}$. Put differently, the reference side area $A_{ref}$ may be determined in accordance with the following: $A_{ref}=A_{nom}+A'_{load}$.

Purely by way of example, as exemplified in FIG. 1, the control system 24 may be adapted to:

use the density information, the weight information and the load surface area 14 to thereby determine a height 32 of the material load, and use the height 32 of the material load and the load surface length 16 in order to determine the material load surface area $A_{load}$.

Figure 4B:
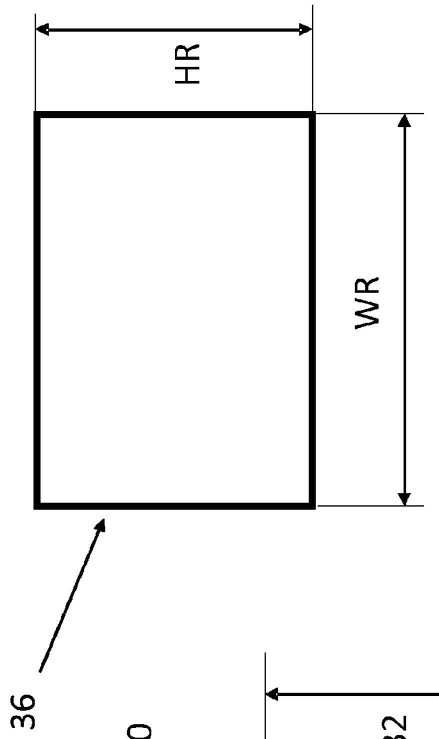
FIG. 4 is a schematic rear view of a vehicle entity.
Figure 4A:
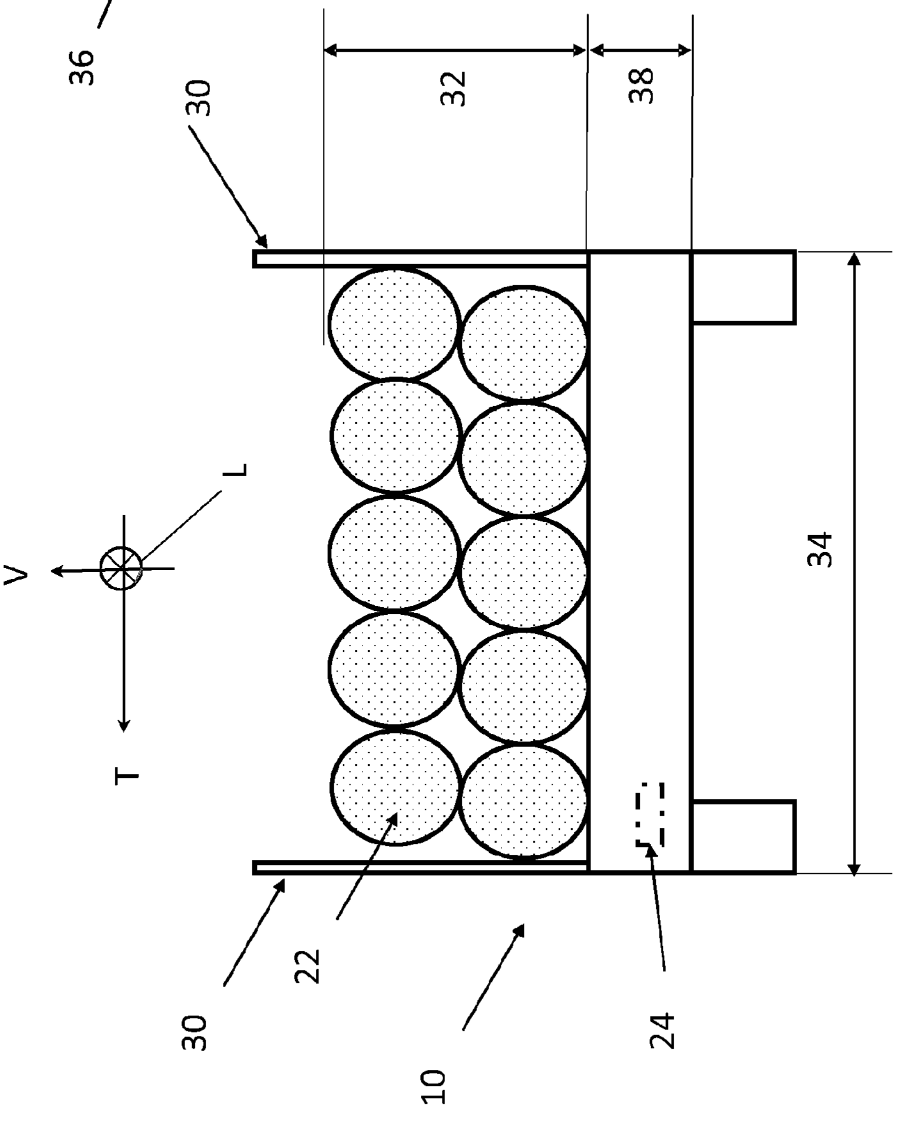

Moreover, with reference to FIG. 4A and FIG. 4B, the control system 24 may be adapted to use a parameter indicative of a width 34 of the vehicle entity 10 in the transversal direction T and to determine the side force coefficient $C_s$ on the basis of at least the width 34 of the vehicle entity 10 and the height 32 of the material load.

As indicated in FIG. 4A and FIG. 4B, the shape of the vehicle entity 10 and the material load 22 in a plane formed by the transversal direction T and the vertical direction V may be approximated by a rectangle 36 having a width WR being equal to the width 34 of the vehicle entity 10 and a height HR being equal to the sum of the height 32 of the material load and a height 38 of a side portion of the vehicle entity 10. The ratio WR/HR between the width WR and the height HR of the rectangle 36 may be used for determining a side force coefficient $C_s$ for the vehicle entity 10. Purely by way of example, the values in the table presented hereinbelow may be used for determining the side force coefficient $C_s$, assuming that the vehicle entity 10 can be approximated as a rectangle with sharp corners.

| WR/HR | $C_s$ |
|---|---|
| 0.1 | 1.9 |
| 0.5 | 2.5 |
| 0.7 | 2.7 |
| 1.0 | 2.2 |
| 2.0 | 1.7 |
| 3.0 | 1.3 |

It should be noted that the values in the above table are only intended to serve as examples for illustrating that the value of the side force coefficient $C_s$ may be dependent on the ratio WR/HR between the width WR and the height HR of the rectangle 36. In other embodiments of the present invention, other values may be used and/or the side force coefficient $C_s$ may for instance be determined using a function rather than a table.

Reverting to FIG. 1, the control system 24 may be adapted to receive wind information for a wind condition currently acting on the vehicle entity 10. As a non-limiting example presented in FIG. 1, the vehicle entity 10 may comprise a wind sensor 40 adapted to determine the wind information and the control system 24 may be adapted to receive the wind information from the wind sensor 40. However, in other embodiments of the present invention, the control system 24 may be adapted to receive the wind information from other types of information sources. As a non-limiting example, the control system may be adapted to receive wind information from weather services issuing the wind information.

Irrespective of how it is determined, the wind information may be indicative of a wind speed, relative to the vehicle entity 10, and a wind heading, relative to the vehicle entity 10. In embodiments of the invention, the control system 24 is adapted to use the wind information, the reference side area $A_{ref}$ and the side force coefficient $C_s$ for determining a wind side force load imparted on the vehicle entity 10. As a non-limiting example, the wind side force load $F_{side\_force}$ may be determined in accordance with the following:

$$F_{side\_force} = \frac{1}{2}\rho u^2 C_s A_{ref} \quad \text{(Eq. 1)}$$

wherein:

ρ is the density of air;

u is the wind speed in a direction perpendicular to the reference side area $A_{ref}$;

$C_s$ is the side force coefficient, and $A_{ref}$ is the reference side area.

Purely by way of example, the side force coefficient $C_s$ may be determined in accordance with the above presentation, such as using a table or an equation. However, it is also contemplated that in embodiments of the control system 24, a fixed value for the side force coefficient $C_s$ may be used.

Since the wind speed u in a direction perpendicular to the reference side area $A_{ref}$ is used in Eq. 1 above, a wind speed $v_{wind}$, relative to the vehicle entity 10, and a wind heading $\theta_{wind}$, relative to the vehicle entity 10, may be used for determining the wind speed u in a direction perpendicular to the reference side area $A_{ref}$. As non-limiting example, assuming that the wind heading $\theta_{wind}$, relative to the vehicle entity 10, relates to the angle that is formed between a propagating direction of the wind and the longitudinal direction L, the wind speed u to be used in Eq. 1 may be determined in accordance with the following:

$$u = v_{wind}\sin(\theta_{wind}) \quad \text{(Eq. 2)}$$

For the sake of completeness, it should be noted that the wind speed $v_{wind}$, relative to the vehicle entity 10, may be referred to as a "apparent wind" being the wind experienced by the vehicle 10 motion. As such, the apparent wind may be regarded as the sum of the wind speed a moving object would experience in still air plus the velocity of the true wind.

It should be noted that in other implementations of the wind sensor 40, the wind sensor 40 may be adapted to only detect the wind speed in the direction perpendicular to the reference side area $A_{ref}$. In such implementations, Eq. 2 above needs not necessarily be used. Instead, the wind speed $v_{wind}$ detected by the wind sensor 40 may be used directly as u in Eq. 1.

The wind side force load $F_{side\_force}$ is a load imparted on the vehicle entity 10 in a direction perpendicular to the reference side area $A_{ref}$. As such, the wind side force load $F_{side\_force}$ will generally extend in a direction parallel to the transversal direction T.

However, when wind acts on the vehicle entity 10, due to e.g. the gap between the vehicle entity 10 and the horizontally extending ground surface 20, the vehicle entity 10 may be imparted a lift force $F_{lift}$ that extends in the vertical direction V and which may be calculated in accordance with the following:

$$F_{lift} = \frac{1}{2}\rho u^2 C_l A_{ref} \quad \text{(Eq. 3)}$$

wherein:

ρ is the density of air;

u is the wind speed in a direction perpendicular to the reference side area $A_{ref}$, $C_l$ is the lift coefficient, and $A_{ref}$ is the reference side area.

As for the side force coefficient $C_s$, the lift coefficient $C_l$ may be determined using a table or an equation. However, it is also contemplated that in embodiments of the control system 24, a fixed value for the lift coefficient C/may be used.

Reverting to the wind side force load, it preferably comprises a wind-imparted roll moment $M_{wind}$ around a roll axle being parallel to the longitudinal direction L. Purely by way of example, the wind-imparted roll moment $M_{wind}$ may be calculated in accordance with the following:

$$M_{wind} = \frac{1}{2}\rho u^2 C_s A_{ref} V_c \qquad \text{(Eq. 4)}$$

wherein:

$V_c$ is the vertical centre of the reference side area $A_{ref}$, see e.g. FIG. 1.

As such, again with reference to FIG. 1, the control system 24 may be adapted to determine a vertical centre $V_c$ and/or a longitudinal centre $L_c$ of the reference side area $A_{ref}$ on the basis of at least the nominal vehicle entity side area $A_{nom}$, the density information, the weight information and the load surface area 14. If the longitudinal centre $L_c$ is used in Eq. 4 instead of the vertical centre $V_c$, Eq. 4 would be representative for a yaw moment around a yaw axis $A_{yaw}$ that may extend in the vertical direction V, see FIG. 1.

It should also be noted that in embodiments of the control system, the wind-imparted roll moment $M_{wind}$ may be determined using e.g. a combination of the wind side force load $F_{side\_force}$ and the wind lift force $F_{lift}$.

In the above example equations in Eq. 1-Eq. 4, the side force load $F_{side\_force}$ for instance has been determined using information indicative of the reference side area $A_{ref}$ as well as a wind speed in a direction perpendicular to the reference side area $A_{ref}$. However, it is also contemplated that the reference side area $A_{ref}$ may be used for calculating the side force load $F_{side\_force}$ for instance using other equations.

Purely by way of example, it is envisaged that the side force coefficient $C_s$ ($\theta_{wind}$) may be dependent on the wind heading $\theta_{wind}$, relative to the vehicle entity 10. In a similar vein, the area A ($\theta_{wind}$) exposed to the wind may also be dependent on the wind heading $\theta_{wind}$, relative to the vehicle entity 10. Here, it should be noted that the reference side area $A_{ref}$ may be used when determining the area A ($\theta_{wind}$) exposed to the wind. Purely by way of example, for a wind heading $\theta_{wind}$ of 90°, indicating a wind from the side of the vehicle 10, the area A ($\theta_{wind}$) exposed to the wind may equal the reference side area $A_{ref}$. On the other hand, for a wind heading $\theta_{wind}$ of 0°, indicating a wind from the front of the vehicle 10, the area A ($\theta_{wind}$) exposed to the wind may be independent of the reference side area $A_{ref}$. Moreover, for wind headings $\theta_{wind}$ between 0° and 90°, the area A ($\theta_{wind}$) exposed to the wind may be determined using the reference side area $A_{ref}$ and trigonometric functions. As such, the side force load $F_{side\_force}$ for a certain wind heading $\theta_{wind}$ may be determined in accordance with the following:

$$F_{side\_force} = \frac{1}{2}\rho u^2 C_s(\theta_{wind})A(\theta_{wind}) \qquad \text{(Eq. 5)}$$

It should be noted that the calculation of the side force load $F_{side\_force}$ as exemplified in Eq. 5 hereinabove also may be applicable to the determination of the lift force $F_{lift}$, a drag force $F_{drag}$ and/or a wind-imparted roll moment $M_{wind}$. As such, in embodiments of the control system 24 and/or the method of the present invention, the lift force $F_{lift}$ may be determined in accordance with the following:

$$F_{lift} = \frac{1}{2}\rho u^2 C_l(\theta_{wind})A(\theta_{wind}) \qquad \text{(Eq. 6)}$$

wherein:

ρ is the density of air;

u is the wind speed, associated with a certain wind heading $\theta_{wind}$;

$C_l$ is the lift coefficient as a function of the wind heading $\theta_{wind}$, and A is the area exposed to the wind as a function of the wind heading $\theta_{wind}$.

In a similar vein, a drag force $F_{drag}$ may be determined in accordance with Eq. 7 presented hereinbelow. A drag force $F_{drag}$ is generally a load acting in the longitudinal direction L of the vehicle 10 and may be defined as a force acting in a direction opposite to the direction of travel of the vehicle 10.

$$F_{drag} = \frac{1}{2}\rho u^2 C_d(\theta_{wind})A(\theta_{wind}) \qquad \text{(Eq. 7)}$$

wherein:

ρ is the density of air;

u is the wind speed, associated with a certain wind heading $\theta_{wind}$;

$C_d$ is the drag coefficient as a function of the wind heading $\theta_{wind}$, and A is the area exposed to the wind as a function of the wind heading $\theta_{wind}$.

As has been explained hereinabove, the area A exposed to the wind as a function of the wind heading $\theta_{wind}$ may be determined using the reference side area $A_{ref}$.

In a similar vein, though purely by way of example, the wind-imparted roll moment $M_{wind}$ may be determined in accordance with the following:

$$M_{wind} = \frac{1}{2}\rho u^2 C_s(\theta_{wind})A(\theta_{wind})V_c(\theta_{wind}) \qquad \text{(Eq. 8)}$$

wherein:

$V_c$ is the vertical centre of the area exposed to the wind.

It should be noted that the vertical centre $V_c$ of the area exposed to the wind as presented in Eq. 8 may also be dependent on the wind heading $\theta_{wind}$.

As may be realized from the above, wind induced forces and/or moments may be determined in a plurality of different ways. However, it is generally beneficial to obtain information indicative of the reference side area $A_{ref}$ when performing such determinations.

As has been intimated hereinabove, the vehicle entity 10 may comprise a suspension system 28 and the control system 24 may be adapted to receive information from and/or to issue information to the suspension system 28. Purely by way of example, the control system 24 may be adapted to use information from the suspension system as the weight information.

Instead of, or in addition to, receiving information from the suspension system 28, the control system 24 may be adapted to issue information to the suspension system 28 in dependence on the determined wind side force load $F_{side\_force}$ imparted on the vehicle entity 10.

Figure 5:
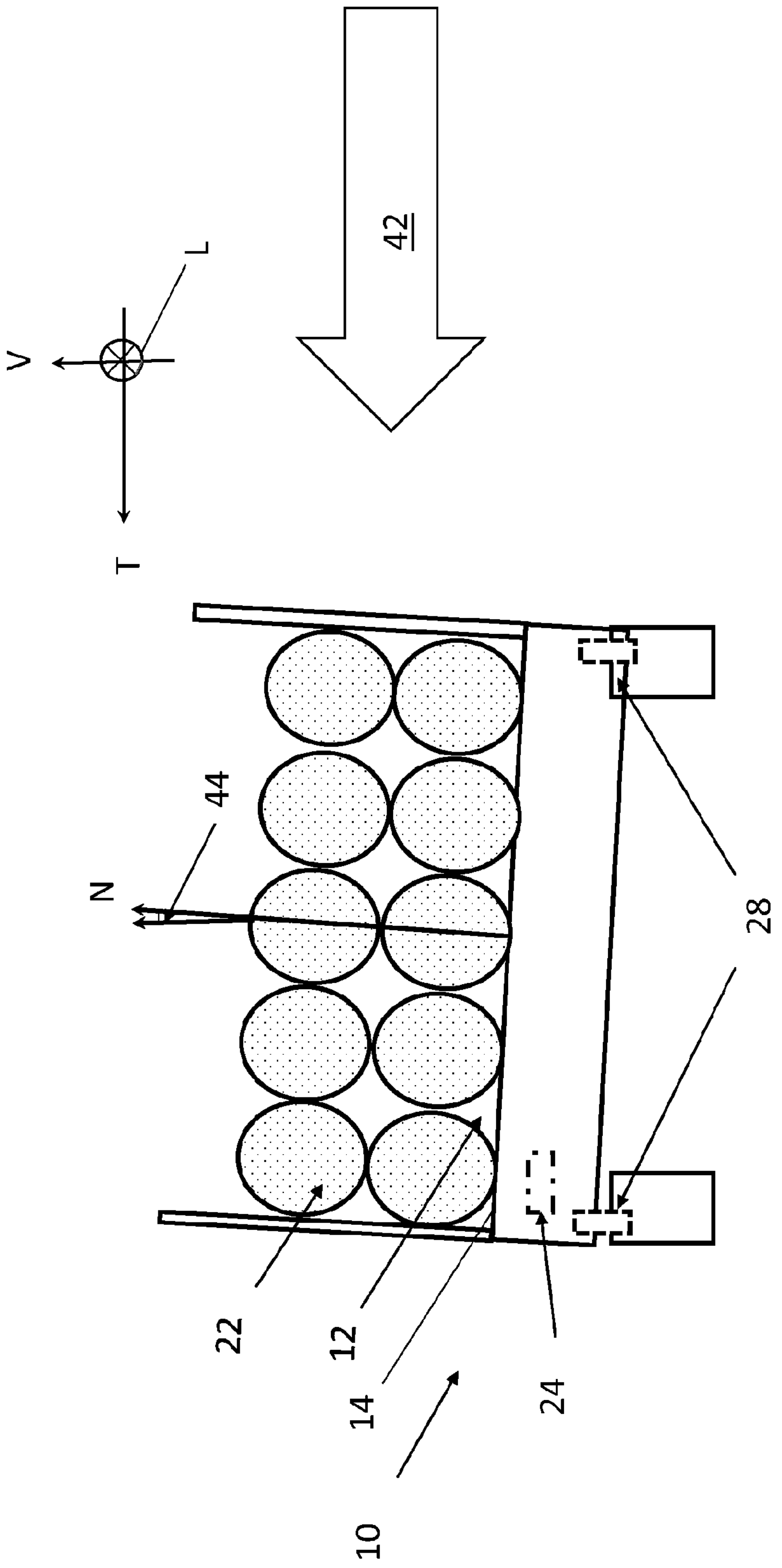
FIG. 5 is a schematic rear view of a vehicle entity in a tilted condition.

With reference to FIG. 5, though purely by way of example, the control system 24 may be adapted to, in response to detecting that the wind side force load, such as a wind-imparted roll moment $M_{wind}$ imparted on the vehicle entity 10 results in a rollover risk exceeding a predetermined risk threshold, issue information to the suspension system 28 such that the vehicle entity 10 assumes a condition with a static inclination towards a windward side of the vehicle entity 10.

As may be gleaned from FIG. 5, and has been intimated above, the load surface area 14 extends in a plane, the normal N of which generally is parallel to the vertical direction V. However, when subjected to wind, indicated by arrow 42 in FIG. 5, which is deemed to result in a rollover risk exceeding a predetermined risk threshold, the control system 24 may be adapted to issue information to the suspension system 28 such that at least the load surface 12 is tilted towards the wind 42 such that the normal N of the load surface area 14 forms an angle 44 to the vertical direction V. Such an orientation of the load surface 12 may reduce the rollover risk. As a non-limiting example, the angle 44 may be within the range of 1°-5°.

Instead of, or in addition to, tilting the load surface 12, the control system 24 may be adapted to one or more other actions in response to detecting a rollover risk exceeding a predetermined risk threshold. Purely by way of example, the control system 24 may be adapted to issue a warning signal to the operator of the vehicle 10. As another non-limiting example, the control system 24 may reduce the maximum allowable speed for the vehicle or, alternatively, reduce the current speed of the vehicle 10.

As has been concluded above, the above presentation is equally applicable to the method of the present invention. However, for the sake of completeness, FIG. 6 presents a flowchart illustrating an embodiment of the method according to the present invention.

Figure 6:
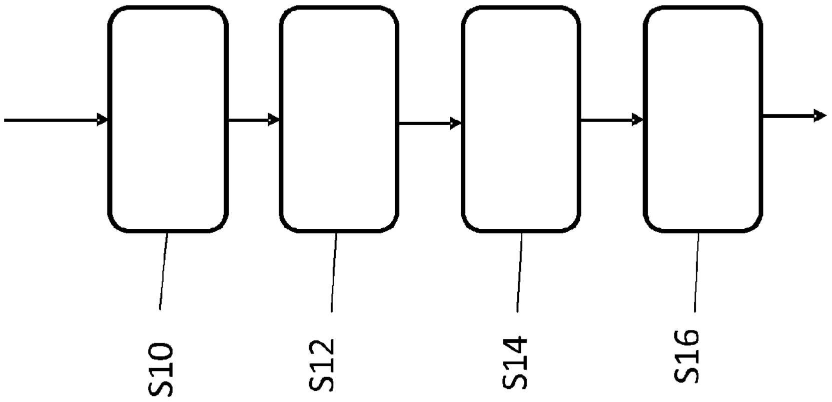
FIG. 6 is a flowchart illustrating an embodiment of a method according to the present invention.

As such, FIG. 6 is a flowchart of a method for determining a reference side area $A_{ref}$ for a vehicle entity 10. The vehicle entity 10 is a vehicle or a vehicle trailer and has a nominal vehicle entity side area $A_{nom}$. The reference side area $A_{ref}$ is adapted to be multiplied with a side force coefficient $C_s$ for determining a side force parameter proportional to a wind side force load imparted on the vehicle entity 10 and/or to be multiplied with a lift coefficient $C_l$ for determining a lift parameter proportional to a wind lift load imparted on the vehicle entity and/or to be combined with a drag coefficient $C_d$ for determining a drag load $F_{drag}$ imparted on the vehicle entity 10. The vehicle entity 10 comprises a load surface 12 adapted to receive a material load 22 such that at least a portion of the material load 22 can be exposed to wind loads. The load surface 12 is associated with a load surface area 14 and a load surface length 16.

The vehicle entity 10 has a longitudinal extension n a longitudinal direction L, a transversal extension in a transversal direction T and a vertical extension in a vertical direction V such that when the vehicle entity 10 is supported by a horizontally extending ground surface, the vertical direction V is parallel to a normal of the horizontally extending ground surface. The longitudinal direction L corresponds to an intended direction of travel of the vehicle entity and the transversal direction T is perpendicular to each one of the longitudinal direction L and the vertical direction V.

The load surface area 14 extends in a plane, the normal of which is parallel to the vertical direction V. The load surface length 16 extends in the longitudinal direction. Each one of the reference side area $A_{ref}$ and the nominal vehicle entity side area $A_{nom}$ extends in a plane P, the normal of which is parallel to the transversal direction T.

With reference to FIG. 6, the method comprises:

S10: receiving density information indicative of a density ρ of material loaded onto the load surface 12;

S12: receiving weight information indicative of a weight $w_{material}$ of material loaded onto the load surface 12;

S14: using the density information, the weight information, the load surface area 14 and the load surface length 16 in order to determine a material load surface area $A_{load}$, the material load surface area $A_{load}$ extending in a plane P, the normal of which is parallel to the transversal direction T, and S16: using the material load surface area $A_{load}$ and the nominal vehicle entity side area $A_{nom}$ in order to determine the reference side area $A_{ref}$.

It is to be understood that the present invention is not limited to the embodiments described above and illustrated in the drawings; rather, the skilled person will recognize that many changes and modifications may be made within the scope of the appended claims.

The invention claimed is:

1. A control system for determining a reference side area for a vehicle entity, the vehicle entity being a vehicle or a vehicle trailer and having a nominal vehicle entity side area, the reference side area adapted to be at least one of:

multiplied with a side force coefficient for determining a side force parameter proportional to a wind side force load imparted on the vehicle entity;

multiplied with a lift coefficient for determining a lift parameter proportional to a wind lift load imparted on the vehicle entity; and combined with a drag coefficient for determining a drag load imparted on the vehicle entity;

the vehicle entity comprising a load surface adapted to receive a material load such that at least a portion of the material load can be exposed to wind loads, the load surface being associated with a load surface area and a load surface length;

the vehicle entity having a longitudinal extension in a longitudinal direction, a transversal extension in a transversal direction, and a vertical extension in a vertical direction such that when the vehicle entity is supported by a horizontally extending ground surface, the vertical direction is parallel to a normal of the horizontally extending ground surface, the longitudinal direction corresponding to an intended direction of travel of the vehicle entity and the transversal direction being perpendicular to each one of the longitudinal direction and the vertical direction; and the load surface area extending in a plane, the normal of which is parallel to the vertical direction, the load surface length extending in the longitudinal direction, each one of the reference side area and the nominal vehicle entity side area extending in a plane, the normal of which is parallel to the transversal direction, the control system being adapted to:

receive density information indicative of a density of material loaded onto the load surface;

receive weight information indicative of a weight of material loaded onto the load surface;

receive wind information for a wind condition currently acting on the vehicle entity, the wind information being indicative of a wind speed, relative to the vehicle entity, and a wind heading, relative to the vehicle entity;

use the density information, the weight information, the load surface area and the load surface length in order to determine a material load surface area, the material load surface area extending in a plane, the normal of which is parallel to the transversal direction;

use the material load surface area and the nominal vehicle entity side area in order to determine the reference side area;

use the wind information and the reference side area to determine wind load information comprising at least one of:

a wind side force load imparted on the vehicle entity;

a wind lift load imparted on the vehicle entity; and a drag load imparted on the vehicle entity; and initiate, based on the wind load information, at least one corrective action of:

reduce a maximum allowable speed for the vehicle entity;

reduce a current speed of the vehicle entity; and adjust a suspension system of the vehicle entity.

2. The control system of claim 1, wherein the vehicle entity comprises a suspension system and wherein the control system is adapted to at least one of receive information from the suspension system and and/or te-issue information to the suspension system.

3. The control system of claim 2, wherein the control system is adapted to receive wind information for a wind condition currently acting on the vehicle entity, the wind information being indicative of a wind speed, relative to the vehicle entity, and a wind heading, relative to the vehicle entity, the control system being adapted to use the wind information, the reference side area and the side force coefficient for determining a wind side force load imparted on the vehicle entity, and wherein the control system is further adapted to issue information to the suspension system in dependence on the determined wind side force load imparted on the vehicle entity.

4. The control system of claim 3, wherein the suspension system comprises at least one actuator, wherein the control system is adapted to, in response to detecting that the wind side force load imparted on the vehicle entity results in a rollover risk exceeding a predetermined risk threshold, issue information to the at least one actuator of the suspension system to cause the vehicle entity to assume a condition with a static inclination towards a windward side of the vehicle entity.

5. The control system of claim 2, wherein the control system is adapted to use information from the suspension system as the weight information.

6. A vehicle entity being a vehicle or a vehicle trailer and having a nominal vehicle entity side area, the vehicle entity comprising a load surface adapted to receive a material load such that at least a portion of the material load can be exposed to wind loads, the load surface being associated with a load surface area and a load surface length;

the vehicle entity having a longitudinal extension in a longitudinal direction, a transversal extension in a transversal direction and a vertical extension in a vertical direction such that when the vehicle entity is supported by a horizontally extending ground surface, the vertical direction is parallel to a normal of the horizontally extending ground surface, the longitudinal direction corresponding to an intended direction of travel of the vehicle entity and the transversal direction being perpendicular to each one of the longitudinal direction and the vertical direction;

the load surface area extending in a plane, the normal of which is parallel to the vertical direction, the load surface length extending in the longitudinal direction, each one of the reference side area and the nominal vehicle entity side area extending in a plane, the normal of which is parallel to the transversal direction; and the vehicle entity comprising the control system of claim 1.

7. The vehicle entity of claim 6, wherein the vehicle entity comprises a suspension system adapted to issue information indicative of the condition of the suspension system.

8. The vehicle entity of claim 6, wherein the vehicle entity comprises a wind sensor adapted to determine wind information for a wind load currently imparted on the vehicle entity, the wind information being indicative of a wind speed, relative to the vehicle entity, and a wind heading, relative to the vehicle entity.

9. The vehicle entity of claim 6, wherein the vehicle entity comprises a density input unit via which an operator can enter the density information.

10. The control system of claim 1, wherein the control system is adapted to:

use the density information, the weight information and the load surface area to thereby determine a height of the material load; and use the height of the material load and the load surface length in order to determine the material load surface area.

11. The control system of claim 10, wherein the control system is adapted to use a parameter indicative of a width of the vehicle entity in the transversal direction and to determine the side force coefficient on the basis of at least the width of the vehicle entity and the height of the material load.

12. The control system of claim 1, wherein the control system is adapted to:

determine a material load surface area portion that is not covered by the vehicle entity, as seen in the transversal direction; and add the material load surface area portion to the nominal vehicle entity side area in order to determine the reference side area.

13. The control system of claim 1, wherein the vehicle entity comprises a wind sensor adapted to determine the wind information, the control system being adapted to receive the wind information from the wind sensor.

14. The control system of claim 1, wherein the vehicle entity comprises a density input unit via which an operator can enter the density information, the control system being adapted to receive the density information from the density input unit.

15. The control system of claim 1, wherein the control system is adapted to determine at least one of a vertical center and a longitudinal center of the reference side area on the basis of at least the nominal vehicle entity side area, the density information, the weight information and the load surface area.

16. A method for determining a reference side area for a vehicle entity, the vehicle entity being a vehicle or a vehicle trailer and having a nominal vehicle entity side area, the reference side area adapted to be at least one of:

multiplied with a side force coefficient for determining a side force parameter proportional to a wind side force load imparted on the vehicle entity;

multiplied with a lift coefficient for determining a lift parameter proportional to a wind lift load imparted on the vehicle entity; and combined with a drag coefficient for determining a drag load imparted on the vehicle entity the vehicle entity comprising a load surface adapted to receive a material load such that at least a portion of the material load can be exposed to wind loads, the load surface being associated with a load surface area and a load surface length;

the vehicle entity having a longitudinal extension in a longitudinal direction, a transversal extension in a transversal direction and a vertical extension in a vertical direction such that when the vehicle entity is supported by a horizontally extending ground surface, the vertical direction is parallel to a normal of the horizontally extending ground surface, the longitudinal direction corresponding to an intended direction of travel of the vehicle entity and the transversal direction being perpendicular to each one of the longitudinal direction and the vertical direction; and the load surface area extending in a plane, the normal of which is parallel to the vertical direction, the load surface length extending in the longitudinal direction, each one of the reference side area and the nominal vehicle entity side area extending in a plane, the normal of which is parallel to the transversal direction, the method comprising:

receiving density information indicative of a density of material loaded onto the load surface;

receiving weight information indicative of a weight of material loaded onto the load surface;

receiving wind information for a wind condition currently acting on the vehicle entity, the wind information being indicative of a wind speed, relative to the vehicle entity. and a wind heading, relative to the vehicle entity:

using the density information, the weight information, the load surface area and the load surface length in order to determine a material load surface area, the material load surface area extending in a plane, the normal of which is parallel to the transversal direction;

using the material load surface area and the nominal vehicle entity side area in order to determine the reference side area;

using the wind information and the reference side area to determine wind load information comprising at least one of:

a wind side force load imparted on the vehicle entity;

a wind lift load imparted on the vehicle entity; and a drag load imparted on the vehicle entity; and initiating, based on the wind load information, at least one corrective action of:

reducing a maximum allowable speed for the vehicle entity;

reducing a current speed of the vehicle entity; and adjusting a suspension system of the vehicle entity.

17. The method of claim 16, wherein the vehicle entity comprises a suspension system and wherein the method comprises at least one of receiving information from the suspension system and/or-issuing information to the suspension system.

18. The method of claim 17, further comprising:

receiving wind information for a wind condition currently acting on the vehicle entity, said wind information being indicative of a wind speed, relative to the vehicle entity, and a wind heading, relative to the vehicle entity, the method comprising using the wind information, the reference side area and the side force coefficient for determining a wind side force load imparted on the vehicle entity; and issuing information to the suspension system in dependence on the determined wind side force load imparted on the vehicle entity.

19. The method of claim 18, wherein the suspension system comprises at least one actuator, wherein the method comprises, in response to detecting that the wind side force load imparted on the vehicle entity results in a rollover risk exceeding a predetermined risk threshold, issuing information to the at least one actuator of the suspension system to tilt the vehicle, causing the vehicle entity to assume a condition with a static inclination towards a windward side of the vehicle entity.

20. The method of claim 17, wherein the method comprises using information from the suspension system as the weight information.

21. The method of claim 16, wherein the method comprises:

using the density information, the weight information and the load surface area to thereby determine a height of the material load; and using the height of the material load and the load surface length in order to determine the material load surface area.

22. The method of claim 21, further comprising using a parameter indicative of a width of the vehicle entity in the transversal direction and determining the side force coefficient on the basis of at least the width of the vehicle entity and the height of the material load.

23. The method of claim 16, further comprising:

determining a material load surface area portion that is not covered by the vehicle entity, as seen in the transversal direction; and adding the material load surface area portion to the nominal vehicle entity side area in order to determine the reference side area.

24. The method of claim 16, wherein the vehicle entity comprises a wind sensor adapted to determine the wind information, the method comprising receiving the wind information from the wind sensor.

25. The method of claim 16, wherein the vehicle entity comprises a density input unit via which an operator can enter the density information, the method comprising receiving the density information from the density input unit.

26. The method of claim 16, further comprising determining at least one of a vertical center and and/or a longitudinal center of the reference side area on the basis of at least the nominal vehicle entity side area, the density information, the weight information and the load surface area.

* * * * *